(12) United States Patent
Schoonen et al.

(10) Patent No.: US 11,504,645 B2
(45) Date of Patent: Nov. 22, 2022

(54) TWO-PHASE ELECTROEXTRACTION FROM MOVING PHASES

(71) Applicant: UNIVERSITEIT LEIDEN, Leiden (NL)

(72) Inventors: Jan-Willem Schoonen, Leiden (NL); Peter Lindenburg, Leiden (NL); Vincent Van Duinen, Leiden (NL); Amar Oedit, Leiden (NL); Paul Vulto, Leiden (NL); Thomas Hankemeier, Leiden (NL)

(73) Assignee: Universiteit Leiden

( * ) Notice: Subject to any disclaimer, the term of this patent is extended or adjusted under 35 U.S.C. 154(b) by 0 days.

(21) Appl. No.: 14/898,813

(22) PCT Filed: Jun. 19, 2014

(86) PCT No.: PCT/NL2014/050405
§ 371 (c)(1),
(2) Date: Dec. 16, 2015

(87) PCT Pub. No.: WO2014/204311
PCT Pub. Date: Dec. 24, 2014

(65) Prior Publication Data
US 2016/0114261 A1    Apr. 28, 2016

(30) Foreign Application Priority Data
Jun. 19, 2013  (NL) ...................... 2011010

(51) Int. Cl.
*B01D 11/04*    (2006.01)
*G01N 1/40*    (2006.01)
*B01L 3/00*    (2006.01)

(52) U.S. Cl.
CPC ...... *B01D 11/0419* (2013.01); *B01D 11/0496* (2013.01); *B01L 3/502776* (2013.01);
(Continued)

(58) Field of Classification Search
CPC .. B01D 11/0419; B01D 11/0496; G01N 1/40; G01N 2001/4072; G01N 2001/4038;
(Continued)

(56) References Cited

U.S. PATENT DOCUMENTS 3,472,080 A    10/1969  Webb
3,841,984 A    10/1974  Barnes
(Continued)

FOREIGN PATENT DOCUMENTS

WO    WO-9612541 A1 *  5/1996  ............. B01D 11/04
WO    2003099440 A1    12/2003
(Continued)

OTHER PUBLICATIONS

Hardt et al. (S. Hardt, T. Hahn, Microfluidics with aqueous two-phase systems, Lab on a Chip, 12 (2012) 343).*
(Continued)

*Primary Examiner* — Joshua L Allen
(74) *Attorney, Agent, or Firm* — Troutman Pepper Hamilton Sanders LLP (57) ABSTRACT

The present invention relates to a process for the electro extraction of molecules from a moving fluid donor phase into an acceptor phase, comprising the steps of: providing an electrically conductive donor phase moving at a first flow velocity and in electrically conductive contact with a first electrode, providing an electrically conductive acceptor phase in direct contact and immiscible with the donor phase, in electrically conductive contact with a second electrode; and providing a supporting or confining phase guide pattern to keep a defined interface between donor phase and acceptor phase, and (d) applying an electrical field between the first and the second electrode.

9 Claims, 7 Drawing Sheets

(52) U.S. Cl.
CPC ........ G01N 1/40 (2013.01); *B01L 2200/0636* (2013.01); *B01L 2300/0645* (2013.01); *G01N 2001/4038* (2013.01); *G01N 2001/4072* (2013.01)

(58) Field of Classification Search
CPC ....... B01L 3/502776; B01L 2300/0645; B01L 2200/0636
See application file for complete search history.

(56) References Cited

U.S. PATENT DOCUMENTS

| | | | |
|---|---|---|---|
| 2004/0028580 A1* | 2/2004 | Futami | B01F 13/0059 422/211 |
| 2004/0219078 A1* | 11/2004 | Kitamori | B01F 13/0062 422/504 |
| 2010/0078553 A1 | 4/2010 | Corso et al. | |
| 2014/0363356 A1* | 12/2014 | Ralston | C22B 3/0005 423/24 |
| 2015/0238952 A1* | 8/2015 | Vulto | B01L 3/502746 422/500 |

FOREIGN PATENT DOCUMENTS

| | | | | |
|---|---|---|---|---|
| WO | WO-2006037561 A1 * | 4/2006 | ........ | B01L 3/502761 |
| WO | 2007004892 A1 | 1/2007 | | |
| WO | 2008118808 A1 | 10/2008 | | |
| WO | 2010022441 A1 | 3/2010 | | |
| WO | WO-2010022441 A1 * | 3/2010 | ............ | B01D 11/04 |
| WO | 2010085279 A1 | 7/2010 | | |
| WO | 2010086179 A2 | 8/2010 | | |
| WO | WO-2010086179 A2 * | 8/2010 | ........ | B01L 3/502746 |
| WO | 2012120102 A1 | 9/2012 | | |

OTHER PUBLICATIONS

Tokeshi et al. (M. Tokeshi, T. Minagawa, K. Uchiyama, A. Hibara, K. Sato, H. Hisamoto, T. Kitamori, Continuous-flow chemical processing on a microchip by combining microunit operations and a multiphase flow network, Anal. Chem. 74 (2002) 1565-1571).*
Hardt et al. (S. Hardt, T. Hahn, Microfluidics with aqueous two-phase systems, Lab Chip 12 (2012) 434-442). (Year: 2012).*
Hahn et al. (T. Hahn, G. Munchow, S. Hardt, Electrophoretic transport of biomolecules across liquid-liquid interfaces, J. Phys.: Condens. Matter 23 (2011) 184107) (Year: 2011).*
Aota et al., Parallel Multiphase Microflows: Fundamental Physics, Stablization Methods and Applications, Lab on a Chip (Jan. 1, 2009), 9(17):2470.
International Search Report for PCT/NL2014/050405 dated Oct. 10, 2014.
Lindenburg et al., Online capillary liquid-liquid electroextraction of peptides as fast pre-concentration prior to LC-MS, Electrophoresis (Dec. 2010), 31:3903-3912.
Schoonen et al., Continuous-Flow Microelectroextraction for Enrichment of Low Abundant Compounds, Analytical Chem. (Jun. 3, 2014), 86(16):8048-8056.
Van Der Vlis et al., Combined liquid electroextraction and isotachophoresis as a fast on-line focusing step in capillary electrophoresis, J. Chromatogr. A (1994), 687:333-341 (Abstract).
Hyotylainen, Critical evaluation of sample pretreatment techniques, Analytical and Bioanalytical Chemistry (2009), 394:743-758 (DOI 10.1007/s00216-009-2772-2).
Jonsson, On-chip membrane extraction in analytical sample preparation: II. Applications, Trac-Trends in Analytical Chemistry (1999), 18:325-334 (DOI 10.1016/S0165-9936(99)00103-X).
Jonsson, On-chip membrane extraction in analytical sample preparation: I. Principles, Trac-Trends in Analytical Chemistry (1999), 18:318-325, (DOI 10.1016/30165-9936(99)00102-8).
Lindenburg, Feasibility of electroextraction as versatile sample preconcentration for fast and sensitive analysis of urine metabolites, demonsliated on acylcarnitines, Electrophoresis (2012), 33:2987-2995, (DOI 10.1002elps.201200276).
Lindenburg et al., On-line large-volume electroextraction coupled to LC-MS to improve detection of peptides, Journal of a Chromatography A Manuscript Draft (2012), 1249:17-24, (DOI 10.1016/j.chroma.2012.06.016).
Petersen, On-Chip Electro Membrane Extraction with Online Ultraviolet and Mass Spectrometric Detection, Anal Chem (2011), 83:44-51, (DOI 10.1021/Ac1027148).
Petersen, On-chip electromembrane extraction for monitoring drug metabolism in real time by electrospray ionization mass spectrometry, Analyst (2012), 137:3321-3327, (DOI 10.1039/C2an35264h).
Stichlmair, Electroextraction: A novel separation technique, Chemical Engineering Science (1992), 47:3015-3022, (DOI 10.1016/0009-2509(92)87003-9).
Van Der Vlis et al., Combined liquid-liquid electroextraction and isotachophoresis as a fast on-line focusing step in capillary electrophoresis, Journal of Chromatography A (1994), 687:333-341.
Vulto et al., Phaseguides: a paradigm shift in microfluidic priming and emptying, Lab on a Chip (2011), 11(9):1596-1602, (DOI 10.1039/C0lc00643b).

* cited by examiner

TWO-PHASE ELECTROEXTRACTION FROM MOVING PHASES

CLAIM OF PRIORITY

This application is a U.S. national stage filing under 35 U.S.C. § 371 of International Application No. PCT/NL2014/050405 filed on Jun. 19, 2014 entitled "TWO-PHASE ELECTROEXTRACTION FROM MOVING PHASES," which claims priority from Netherlands Patent Application Number 2011010 filed on Jun. 19, 2013, both of which are incorporated herein by reference in their entirety.

The present invention relates to a process and apparatus for the extraction of compounds from a sample.

BACKGROUND OF THE INVENTION

Solvent extraction processes using application of an electric field to enhance mass transfer from one phase into the other are commonly known as "electroextraction". When an electrical field is applied in an immiscible two-phase liquid-liquid system consisting of a low conductive organic phase and a higher or highly conductive aqueous phase, charged compounds that are in the organic phase will migrate fast toward the aqueous phase. As the aqueous phase is entered, migration speed decreases dramatically, causing analyte concentration at the interface.

Originally, electroextraction had been developed as a purification technique in the field of chemical engineering to enhance product yields, see for instance U.S. Pat. No. 3,841,984 and U.S. Pat. No. 3,472,080. More recently, electroextraction has been adapted for analytical purposes, extracting compounds from an organic into an aqueous phase in capillary vessels, as disclosed for instance in J. Chromatogr. A 1994, 687, 333-341 and Electrophoresis 2010, 31, 3903-3912. While this generally is a very effective process, it requires the analytes to be dissolved in an organic phase, which limits the potential application to molecules having an appropriate solubility, and involves an extra diluting step in the analytical procedure, i.e. the mixing of the sample with an organic phase.

A different approach was disclosed in WO-A-2007004892. Herein a process is disclosed for the electro-assisted extraction of at least one ionized or partially ionized organic compound from a first hydrophilic donor solution through a liquid membrane comprising an immobilized organic solvent into a second hydrophilic acceptor solution. While this process may allow extracting aqueous analyte samples from a first into a second aqueous solution, the presence of the membrane will only allow a limited number of compounds to pass into the receptor solution due to the transport limitation associated with the liquid membrane, and the fact that the artificial liquid membrane discriminates the majority of endogenous compounds from a biological matrix, which is highly undesired in metabolomics. Yet further, the device is complex, and the membrane will need to be discarded after a single application.

Because current electroextraction setups make use of a fixed volume biphasic system, the electroextraction process is self-limiting as a result of the depletion of analytes during the process. Moreover, current electroextraction setups cannot be used for continuous injections as the solvents cannot be renewed during the process. We have developed a chip making it possible to robustly electro extract analytes from continuously replenished organic donor solution into a small volume of either stagnant or a flowing aqueous solution. The chip works for many solvent types and does not make use of gels, membranes to make the biphasic flows compatible.

Accordingly, there remains a need to improve the efficiency of the electroextraction processes.

SUMMARY OF THE INVENTION

The present invention relates to a process for the electroextraction of compounds from a moving fluid donor phase into an acceptor phase, comprising the steps of: providing an electrically conductive donor phase moving at a first flow velocity and in electrically conductive contact with a first electrode, providing an electrically conductive acceptor phase in direct contact and immiscible with the donor phase, in electrically conductive contact with a second electrode; and providing a supporting or confining phase guide pattern to keep a defined interface between donor phase and acceptor phase, and (d) applying an electrical field between the first and the second electrode. The invention further relates to a device for the two phase electroextraction, comprising: (i) a channel for transporting a fluid stream comprising a volume defined by a channel floor and two channel walls, and (ii) a first electrode for contacting a first phase arranged at one of the channel walls, and a second electrode for contacting a second phase arranged at an opposite channel wall to the first electrode to apply an electrical field in orthogonal direction of the flow direction, and means for applying an electrical field over the two electrodes, and (iii) a contour phase guide arranged on the channel floor and following the contours of the floor at a given distance to the channel walls from the inlet to the outlet conduit, for separating the at least two phases by pinning the meniscus of the phase boundaries to the phase guide.

BRIEF DESCRIPTION OF THE FIGURES

These and further features can be gathered from the claims, description and drawings and the individual features, both alone and in the form of sub-combinations, can be realized in an embodiment of the invention and in other fields and can represent advantageous, independently protectable constructions for which protection is hereby claimed. Embodiments of the invention are described in greater detail hereinafter relative to the drawings, wherein:

FIG. 2 (A) shows an image taken at 2.5 times magnification.

Depletion and concentration profiles of the ethyl acetate crystal violet solution fed with 30 µL/min along a stagnant aqueous phase at 0V (B) and 80V (C) were obtained, and are shown, also at magnification of 2.5 times and contrasted to enhance the visualization.

DETAILED DESCRIPTION OF THE INVENTION

The subject process permits to separate and extract compounds from a donor phase directly into one or more acceptor phases, without the need for a physical barrier separating the two phases, e.g. gels, membranes or otherwise complex extraction systems. This permits a simplification of electroextraction processes, and allows operating continuous or semi-continuous methods rather than the batch methods presently known.

Electroextraction for analytical purposes combines features of both liquid-liquid extraction (LLE) and electrophoresis. Electroextraction allows for a high speed extraction of ionic compounds from an organic phase into an aqueous phase. LLE makes use of the partition coefficient of molecules to transfer analytes from an organic phase to an aqueous phase being part of an immiscible solvent system. This extraction process is time consuming, is laborious and is difficult to automate. Moreover, especially for μL sized analyte mixtures, LLE becomes unpractical.

Electroextraction is a technique where an electric potential is applied over a biphasic solvent system. The biphasic solvent system comprises of an organic analyte donor solution and an aqueous analyte acceptor solution. The electric field induced by the potential drives charged analytes (anions/cations) towards the aqueous phase. The migration velocities in the organic phase are very high because the electric field is very high due to the low electrical conductance. In the aqueous phase, the migration velocities of charged analytes are relatively very low due to the high electrical conductance. This means charged analytes will stack in a very thin water layer just after the organic/water interface.

Preferably, by constantly refreshing the donor solution and keeping the acceptor solution stagnant, extremely high and selective analyte enhancement factors can be obtained with electroextraction.

In contrast to LLE, electroextraction is a faster technique because the applied potential increases the migration velocities by 2 or more orders of magnitude and hence decreases the migration times.

Due to the excellent enhancement factors that can be achieved in relatively short times, the electroextraction process lends itself perfectly as a sample pre-treatment technique for the analysis of small plugs of sample material such as CE-MS or LC-MS.

The present invention advantageously also relates to a device, preferably a microfluidic chip for the enrichment of analytes based on the migration of charged analytes.

An advantage of the subject process is that analytes dissolved in relatively large organic solvent volumes, e.g. the donor phase, migrate with comparatively high speed into a relatively small volume of a polar acceptor phase, e.g. an aqueous solvent, thereby tremendously increasing the concentration levels in short time intervals.

An important feature of the subject process and device is the ease of operation and the capability of independently handling of immiscible solvent flows through phase guide technology implemented on a chip.

This chip may make use of analyte enrichment based on electroextraction but other electro driven solvent analyte enhancement techniques can be used with minor adaptations as well.

The chip is particularly suitable for automated procedures and thus significantly permits to reduce the labour intensity of the selective concentration procedure of cations or anions from a sample prior to analysis by capillary electrophoresis coupled to mass spectrometry (CE-MS) or liquid chromatography coupled to mass spectrometry (LC-MS).

The donor phase and the acceptor phase are essentially immiscible during the process, which is of particular importance since a least the donor phase flows at a first flow velocity and flow direction through the extraction device. The acceptor phase may flow at a second velocity, which may be lower than that of the donor phase. In order to achieve a strong enrichment, the velocity of the donor phase is much higher than that of the acceptor phase. Preferably the acceptor phase is even stagnant, this permits to pass relatively high volume of donor phase alongside a small volume of an acceptor phase, thereby enriching the compounds that are extracted tin to the acceptor phase, or to the interface boundary between donor and acceptor phase. The acceptor phase may then be drawn into a conduit to remove it on a regular basis, or in a batch-wise manner, giving strongly enriched extractant samples, thus permitting to concentrate the compounds in the donor phase strongly.

The separation between the phases may conveniently improved by appropriate selection of miscibility of the composition of the phases under the process conditions, which is particularly suited for more static systems, or may be achieved at least in part by physical measures in dynamic systems, e.g. separating flowing phases by phase guides, as for instance disclosed in WO-A-2012120102 and/or WO-A-2010086179. The term "immiscible" herein means that the phases remain separate phases in the process. The phases employed in the subject process are to be understood as diluents that dissolve, or stably disperse or emulsify the analyte extractants and possible modifiers, thereby forming a phase.

The present invention relates to a separation performed by electroextraction, using two separate phases, namely a donor phase and at least one acceptor phase. The process may comprise more phases e.g. a three or more phase electroextraction chip.

The donor phase and/or acceptor phase according to the present invention may be any phase that is suitable for the dissolving and/or maintaining the analyte samples in a stable dispersion or emulsion. The donor and/or acceptor phase are preferably electrically conductive, more preferably in presence of the analyte samples, such as for instance an aqueous solution of salts. The phase may preferably comprise a single solvent, or a solvent blend.

The donor and one or more acceptor phases remain immiscible during the process. This implies that the phases remain separate at least at the timescale of, and during the application of the present extraction process.

This may conveniently achieved by immiscibility of the composition of the phases under the process conditions, which is particularly suited for more static systems, or may be achieved at least in part by physical measures in dynamic systems, e.g. separating flowing phases by phase guides, as for instance disclosed in WO-A-2012120102 and/or WO-A-2010086179.

Such systems are particularly useful when combining the process with an additional separation process prior to the electroextraction, which may advantageously also be performed automatically.

The "electrically conductive" herein is to be understood as to provide sufficient conductivity to an electric field, i.e. a current and said at least one analyte compound can traverse the phases, including the one or more acceptor phases. The electrical current that traverses the phases may in principle be any electrical current that does not give rise to instabilities that compromise the integrity of the interfaces between the phases. It is considered preferably that it should be in the lower microampere range, i.e. preferable less than 100 μA, but normally more than 0.01 μA.

The present process can be operated such that either positively or negatively charged compounds are extracted. While this may be achieved through switching polarity, or using two acceptor phases, one at each electrode, the process may also advantageously be conducted in absence of an electrical field, or wherein at least intermittently no field is applied, such that the migration of neutral analytes from the donor phase to the acceptor phase through fractional extraction becomes more predominant. In this way, both charged as well as uncharged compounds may be extracted selectively, or sequentially.

Hence, the present process may also operate at least intermittently with no field applied to allow the migration of neutral analytes from the donor phase to the acceptor phase through fractional extraction.

Donor and/or one or more acceptor phases are in electrically conductive contact with a first and a second electrode, respectively. This contact may advantageously be directly by having a fluid contact between the respective phase and electrode, or preferably through a further phase separating the electrode from the donor or acceptor phase. By this constellation, the occurrence of reduction or oxidation reactions between the analyte samples and/or solvent components, and the electrodes are avoided or at least reduced.

The present process permits to operate at a very low voltage, and hence reduces the potential for undesired electrochemical reactions of analytes with the electrodes. Suitable electrodes may be any electrode capable of providing a current to the phases, preferably suitable commercially available electrodes are employed, for instance platina wires, a conductive metal coating, conductive plastics or graphene composites.

The voltage applied to the electrodes may typically be in the range of 0.01V to 30000V; more preferably 0.1V to 10,000V, even more preferably 0.1V to 1000V, still more preferably 0.1 to 500V; and especially preferably 0.1V to 300V; and ultimately battery operated 0.1 to 9V. The applied voltage may preferably be a DC voltage. In some cases the applied voltage may be pulsed voltage. The polarisation of the voltage may depend on the analyte species to be separated, and may be varied.

Preferably the first electrode is arranged such versus the flow of the phases that an electrical field may be applied that is essentially orthogonal to the flow direction.

Preferably the donor and/or acceptor phase are hydrophilic, comprising solvents or solvent blends. Suitable solvents include aqueous solvents, nonpolar organic solvents such as dimethyl formamide (DMF) and dimethyl sulfoxide DMSO. The aqueous solvent used in the process according to the invention may be optionally a mixture of water and another solvent which is miscible with water and has a low solubility in the organic solvent of the acceptor phase such that two separate phases are formed. A hydrophilic solvent may also comprise water in admixture with a hydrophilic organic solvent, wherein the organic solvent may be present in the range from 0-100% by weight; more preferably in the range from 0-50% by weight and still more preferred from 0-20% by weight. Further, suitable hydrophilic organic solvents may be added, which are preferably miscible with the donor or acceptor phase up to a certain level.

Examples of preferred hydrophilic organic solvents are methanol, ethanol, acetonitrile and DMSO.

The term "acceptor phase" as used in the context of the present application, is a phase suitable for accepting a compound.

At least the donor phase may preferably have a pH at which at least part of the analytes are partially or fully ionised. This can be achieved by addition of a suitable acid or base, as is well known in the art.

Suitable acids may be any acid that can adjust the pH of the donor solution to a level within the range of pH of 1 to 7, whereby an organic compound carrying a basic group is ionised to a cation. Correspondingly, a suitable base may be any base that can adjust the pH of the donor solution to a level within the range of pH of 7 to 14, whereby an organic compound carrying an acidic group is ionised to an anion. Examples of suitable acids are HCl, HBr, HCOOH, $CH_3COOH$, $H_2SO_4$ and $H_3PO_4$. Examples of suitable bases are NaOH, $Na_2CO_3$, $NaHCO_3$ and $NH_3$.

Suitable solvents also may include compressed gases, such as, for example, propane or carbon dioxide, which can be used in the subcritical, near-critical or supercritical phase range. To adjust the properties of these compressed gases, co-solvents such as, for example, ethanol, can optionally be added. Preference is given to using solvents which have no or only slight toxic or other physiologically disadvantageous effects. Further solvents may include silicon oils.

Further suitable solvents include ionic liquids. The term "ionic liquid" herein refers to salts that are liquid over a wide temperature range, including room temperature. Ionic liquids have been described in the art, including chiral, fluorinated, and antibacterial ionic liquids. Ionic liquid properties can be tailored to specific applications, and may be environmentally-friendly alternatives to organic solvents. Ionic liquids can reduce the cost, disposal requirements, and hazards associated with volatile organic compounds. Exemplary properties of ionic liquids include at least one of high ionic conductivity, non-volatility, non-flammability, high thermal stability, wide temperature for liquid phase, highly solvability, and non-coordinating. The choice of cations and anions in the ionic liquids determine the physical properties, such as melting point, viscosity, density, water solubility and further properties of the ionic liquid. For example, big, bulky, and asymmetric cations may be employed, typically resulting in an ionic liquid with a low melting point. As another example, anions can contribute more to the overall characteristics of the ionic liquid, such as air and water stability. The melting point for ionic liquids can be changed by structural variation of at least one of the ions or combining different ions.

Examples of ionic liquid cations include, but are not limited to N-butylpyridinium and 1-alkyl-3-methylimidazolium (1,3-dialkylimidazolium; alkyl mim). Examples of anions include PF6 that is immiscible in water, and BF4-that is miscible in water depending on the ratio of ionic liquid to water, system temperature, and alkyl chain length of cation. Other anions can include triflate (TfO, $CF_3SO^{2-}$), nonaflate (NfO, $CF_3(CF_2)_3SO^{2-}$), bis(triflyl)amide, trifluoroacetate, and nonafluorobutanoate ($CF_3(CF_2)_3CO^{2-}$). Other examples of ionic liquids can include haloaluminates such as chloroaluminate. Chloro- and bromo-ionic liquids can have large electrochemical windows because molten salts prevent solvation and solvolysis of the metal ion species. Further examples of ionic liquids can include 1-alkyl-3-methylimidazolium PF6 such as 1-decyl-3-methylimidazolium PF6,1-butyl-3-methylimidazolium PF6, and 1-ethyl-3-methylimidazolium with $NO_3$, $NO_2$, $MeCO_2$, $SO_4$, $PF_6$, TfO, NfO, $BF_4$, $Tf_2N$, and TA, N-alkylpyridinium chloride or N-alkylpyridium nickel chloride with $C_{12}$ to $C_{18}$-alkyl chains, and any variations of these as are known to one skilled in the art of ionic fluids. Other examples include 1-ethyl-3-methylimidazolium bis(1,2-benzenediolato-O,O')borate, 1-ethyl-3-methylimidazolium bis(salicylato)borate, 1-ethyl-3-methylimidazolium bis(oxalate)borate.

Without wishing to be bound to any particular theory, the main purpose of the one or more phase guides is to create a physical phase boundary between the donor and acceptor phase during the extraction, while concurrently allowing the transport of molecules to be extracted to and/or through the phase interface.

Preferably, at least the one or more acceptor phases are aqueous phases, while the donor phase comprises mainly one or more organic vent(s), resulting in an organic phase.

The donor phase according to the present invention preferably, but not necessarily, is essentially immiscible with either acceptor phase.

Accordingly, "essentially immiscible" herein implies not mixing with, while being in direct contact with the acceptor and donor phase during the extraction process.

Essentially immiscible" herein advantageously may have the meaning that while a phase may dissolve a certain percentage of the other phases, the thus formed solution will remain as a separate phase under the conditions of the process. In this invention it is understood that two solvents or solvent blends are immiscible when two separate phases form when the solvents or phases are mixed under the conditions of the process.

The phase interface(s) according to the present invention are essentially not supported by a membrane or any other contraption comprising hollow fibres. To the contrary, the phases remain a fluid throughout the process, not being suspended or maintained in its position by a membrane, gel, or hollow fibre, and the phase separation is merely based on solubility under the process condition, flow of at least one phase of the system, and the presence of one or more phase guides. The phases are thus in direct fluid contact with one another, but are kept separate due to the immiscibility of the two fluids; while the phase guides preferably keeps the one or more interfaces in place and allows to retain the shape of the interface.

Phase guides may be constructed in a variety of ways. One technique involves constructing a sharp edge. Advancement over such a sharp edge requires a change of the principal radii of a fluid-fluid meniscus, leading to a higher pressure drop over the meniscus thus representing a pressure barrier. This concept is also known as "meniscus pinning".

A typical phase guide is therefore a three-dimensional structure that protrudes into the liquid along the complete length of the meniscus. Pinning of the meniscus on the resulting, elongate protrusion requires such additional energy for the liquid meniscus to cross it that the liquid is confined unless additional energy is applied to the body of liquid. Another typical phase guide is a ridge protruding into the bulk material. In this case pinning occurs before the phase guide. In addition, the phase guide may include a usually deliberate location of weakness at which the energy required to cross the phase guide is lower. At such a location the liquid may, if the phase guide is properly designed, cross the phase guide. This deliberate location of weakness also defines the "stability" of a phase guide, which determines the order or priority of phase guide overflow when a bulk liquid faces multiple phase guides simultaneously during meniscus advancement or recession.

A particularly versatile phase guide is created when the substrate facing the phase guide is more hydrophilic than the phase guide itself. Such an implementation leads to stretching of the meniscus and increases the effect that angles and their radii have on the stability of a phase guide.

Thus the phase guides may, depending on their precise design, either confine a liquid completely; or may permit its advancement or recession only at a preferred location so that the liquid follows a chosen path, fills or empties a particular space in the volume, or adopts a particular shape.

Phase guides may instead of being constructed as protruding barriers be defined by areas on an internal surface of a volume that are of differing degrees of wettability. Again such areas may cause a requirement for the input of energy in order to encourage a liquid meniscus to advance across them.

Numerous designs of phase guide structures are disclosed in WO2010/086179 A2.

The donor phase will have a sufficiently high conductivity in order to enable ion transfer of charged analyte compounds upon applying the electrical field. This may conveniently be achieved by e.g. saturation of the phase with one or more solvents that allow conductivity, e.g. by using ethyl acetate saturated with water as donor phase. The saturation of the donor phase with one or more solvents from the acceptor phase also limits the loss of solvent from the acceptor or donor phase. Suitable solvents for use in the donor phase depend on the properties and composition of the two other phases, i.e. the three phase system has to be maintained.

Where a polar and/or aqueous phase is employed as donor phase, suitable acceptor solvents include, but are not limited to nonpolar to moderately polar solvents, such as, for example, linear or branched cyclic or acyclic alkanes or alkenes, e.g., propane, butane, pentane, hexane, heptane, cyclohexane, petroleum ether, which can optionally be substituted with halogens, in particular chlorine, cyclic or acyclic linear or branched ethers e.g., diethyl ether, tert-butyl methyl ether, tert-butyl ethyl ether, tetrahydrofuran; primary, secondary or tertiary alcohols, in particular alkanols; e.g. n-butanol, tert-butanol, cyclohexanol; esters of short-chain carboxylic acids with short-chain alcohols, e.g., ethyl acetate, butyl acetate, propyl acetate; ketones, e.g., acetone, methyl isobutyl ketone; aromatic solvents, e.g. toluene and xylene, and mixtures of at least two of the above solvents.

Where at least the donor phase, and particularly both donor and acceptor phases are aqueous phases, applicants found that esters of short-chain carboxylic acids with short-chain alcohols, in particular ethyl acetate, were found to be highly effective in extracting certain metabolites.

The choice of acceptor phase and donor phase depends on the according to the present invention depends on the separation process.

Figure 2A:
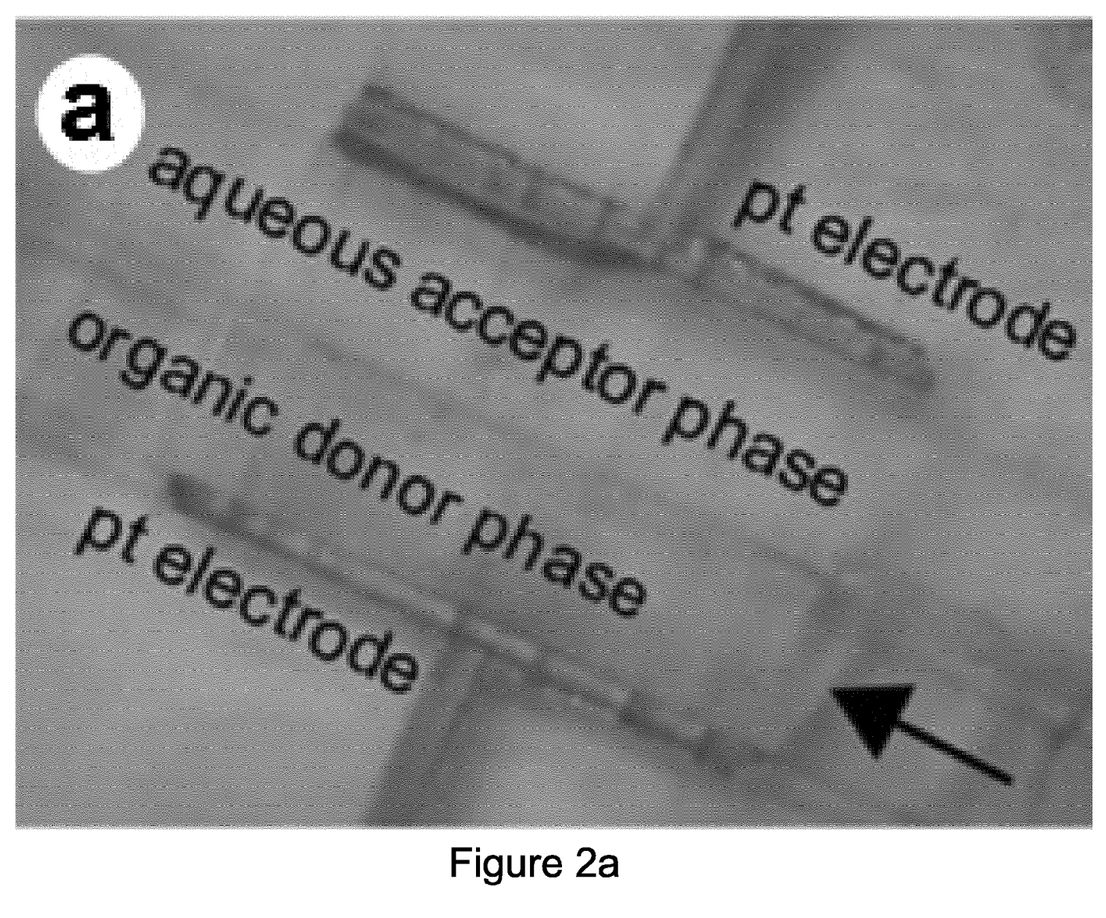

The present invention is not limited to a two-phase system, but the system may comprise further phases. A preferred embodiment comprises at least a further acceptor phase comprising the electrode, wherein this phase is in electrically conductive contact with the donor or acceptor phase. In a further preferred embodiment, the first acceptor phase comprising the first electrode is in direct contact with the donor phase, the donor wedged in between the first and second acceptor phase, effectively acting as a separator phase, and a second acceptor phase comprising the second electrode. FIG. 2 depicts such a system; herein, two acceptor phases are arranged next to a single donor phase, whereby the two acceptor phases also are in contact with the two electrodes, respectively. This line-up may permit to separate the cationic and anionic compounds that are extracted and enriched into different acceptor phases at the same time, and thus allows a highly selective and comprehensive analysis.

In yet a further preferred embodiment, each electrode is formed in such manner as to comprise a separate acceptor phase, e.g. in a capillary vessel, thereby leading to an enrichment of both cationic and anionic analyte species in the respective acceptor fluids.

The present process may be directed at extraction of cationic analyte species, anionic analyte species, and advantageously, also neutral species. In the latter case, the separation through the phase interface may be performed without applying a field, and thus simply based on fractionation extraction.

Without wishing to be bound to any particular theory, it is believed that the small acceptor phase volume may allow removing compounds selectively from the donor phase, even without an electric field, although the latter increases the efficiency of the process significantly. The fractionation extraction may advantageously be optimized by optimizing the surface to volume ratios of the phases, for instance in microfluidic chips.

The ionisation of the analyte compounds may be achieved by pH adjustment, by addition of a complexing agent or phase transfer agent, e.g. borates for carbohydrates (sugar) metabolites, which may act as phase transfer agents, or simply by application of a sufficiently high current over the electrodes. The interface at the phase preferably functions as a filter, ensuring the filtration of proteins, and to remove dust at the phase interface.

The phases may advantageously be tuned to achieve a desired selectivity for certain analytes. This may be advantageously be achieved by varying the composition of the phases. The donor phase may further comprise additives such as ion pairs that may act as phase transfer catalysts, or to increase polarity up to desired level. The electrical field may also be alternated or alternating.

Examples of analytes that may be separated by the present process include organic compounds, such as pharmaceuticals, drugs, colouring agents, poisons, pollutants, food additives and metabolites; nucleotides such as DNA or RNA; proteins, peptides, amino acids, carbohydrates, lipids, polysaccharides fatty acids and phospholipids. Applicants have found that due to the difference in solubility between the donor phase and the acceptor phase, e.g., the transfer of larger, highly charged molecules may be impeded, allowing concentrating smaller and more mobile compounds in the acceptor phase selectively.

The donor phase may be a sample taken directly from a biological source, wherein the analyte compounds is already in a dissolved state. This may for instance be a sample from one of the biological fluids of a person, a water sample from drinking or wastewater, beverages, a sample from a preparative or industrial biochemical, organic or fermentation process. Examples of biological samples are blood, serum, urine, salvia, sputum, semen, cell lysate, embryo lysate, cell fluid, breast milk or (cerebro) spinal fluid. Other samples include the fractions of separation methods, for instance LC or HPLC.

The present process preferably is executed in a manner such that either the donor phase, or the acceptor phase are transportable, i.e. that they can be removed from the system. An example for this is the use of a chip comprising the acceptor fluid and donor fluid side by side in the lumen in fluid communication, whereby the phase boundary is maintained in place by at least one phase guide.

Phase guides may be constructed in a variety of ways. One technique involves constructing a sharp edge. Advancement over such a sharp edge requires a change of the principal radii of a fluid-fluid meniscus, leading to a higher pressure drop over the meniscus thus representing a pressure barrier. This concept is also known as "meniscus pinning".

A typical phase guide is therefore a three-dimensional structure that protrudes into the liquid along the complete length of the meniscus. Pinning of the meniscus on the resulting, elongate protrusion requires such additional energy for the liquid meniscus to cross it that the liquid is confined unless additional energy is applied to the body of liquid. Another typical phase guide is a ridge protruding into the bulk material. In this case pinning occurs before the phase guide. In addition, the phase guide may include a usually deliberate location of weakness at which the energy required to cross the phase guide is lower. At such a location the liquid may, if the phase guide is properly designed, cross the phase guide. This deliberate location of weakness also defines the "stability" of a phase guide, which determines the order or priority of phase guide overflow when a bulk liquid faces multiple phase guides simultaneously during meniscus advancement or recession.

A particularly versatile phase guide is created when the substrate facing the phase guide is more hydrophilic than the phase guide itself. Such an implementation leads to stretching of the meniscus and increases the effect that angles and their radii have on the stability of a phase guide.

Thus the phase guides may, depending on their precise design, either confine a liquid completely; or may permit its advancement or recession only at a preferred location so that the liquid follows a chosen path, fills or empties a particular space in the volume, or adopts a particular shape.

Phase guides may instead of being constructed as protruding barriers be defined by areas on an internal surface of a volume that are of differing degrees of wettability. Again such areas may cause a requirement for the input of energy in order to encourage a liquid meniscus to advance across them.

Phase guides that operate to confine liquids nonetheless may be arranged to permit controlled crossing, by the liquid, of the barrier represented by the phase guide; and/or mixing of two liquids confined on opposite sides of a phase guide or a combination of phase guides that define an interposed barrier structure. Arrangements for achieving these effects are described in WO2010/086179 A2, in which the concept of a "confining phase guide", that is of particular utility in embodiments of the invention described herein, is explained in detail.

This vessel may comprise one or more of the phases employed.

Upon transfer of the components from the donor phase, the acceptor phase enriched with the components can be advantageously simply removed from the acceptor phase by removal of the phase form the lumen. As a result, the thus obtained enriched acceptor fluid may then be subjected directly to a further separation of analysis or separation step e.g. when using the concentrated droplet for mass spectroscopy. Suitable further separation and/or analytical methods include, but are not limited to LC such as RP, NP, HILIC, TLC; CE, NMR, MS, UV/VIS, ED, nano LC, HPLC, UPLC; UHPLC; RP-(UV/VIS)-EV-NP-MS; RP-(UV/VIS)-EV-NMR; NP-(UV/VIS)-EV-CE-MS/RP-(UV/VIS)-EV-CE-MS; RP(UV/VIS)-EV-TLC/NP-(UV/VIS)-EV-TLC; EV-nano LC and CE-EV, of which MS is highly preferred. Examples for suitable MS techniques include GC/MS or GC-MS/MS; in particular nanoelectrospray-Direct-Infusion-MS, such as those for instance disclosed in US-A-2010078553, or WO-A-2008118808, also known as Advion TriVersa (DI-MS); CE-MS; LC-MS; GC-MS and NMR.

The analytes entering the present process may also be the result of the above disclosed separation methods. The acceptor phase may be a deuterated phase where the enriched electro extracted sample may be subjected to an NMR process.

In general, the present process permits to concentrate analytes from a larger donor phase into a mall acceptor phase, thereby leading to a concentration of analyte. The latter is important for methods that are not sensitive enough and hence employ the thus concentrated acceptor phase further, wherein the presence of solvents would be detrimental, e.g. to the resolution of a method, such as a separation method where a solvent exchange is required.

The device according to the invention further relates to a device for the electroextraction from two moving fluid phases.

The geometry of the device may be improved in such a way that efficiency is maximized in terms of contact area between the liquid-liquid interface, decreasing the analyte migration path length, and thereby migration duration) and automated control mechanism which feeds sample solution when this analyte donor solution comes near depletion for each specific application. Furthermore, the device may advantageously be modified and automated to be coupled on-line with a detection and/or separation method, e.g. to CE-MS or LC-MS. The device also permits to couple multidimensional separation platforms, such as LC×LC and LC×CE comprising a modulation technique currently unknown to persons skilled in the art of LC×LC.

The specific geometry of the cross-section is not considered as relevant, provided that the device is suitable for transferring fluids, such as for instance also applicable for channels etched in a microfluidic chip, and permits the application of the one or more phase guides.

Suitable wall materials are essentially inert with respect to the solvents and/or the components carried in the liquid feed, and are further not deformed at the temperatures or conditions employed in the subject device. Typical materials include silicon, metals and/or alloys such as gold, copper or stainless steel, glasses and thermoset polymeric materials such as cross-linked epoxy resins, poly methyl methacrylate, Cyclo-olefin (co)polymers, polyimide, fluoro-ethylene polymer and/or polycarbonate.

A preferred device comprises an electroextraction chip made out of an inert, essentially non-conductive material, e.g. a Cyclo-olefin copolymer, due to its optical (transparent) and chemical (relatively inert to organic solvents) properties. The chip preferably comprises at least two channels, each with an inlet and outlet, separated by the phase guide. Alternatively, it may etched from a waiver, e.g. from silicon, using lithographic methods to define both channels, conduits and/or the contour phase guide.

The electrodes may then advantageously be deposited on the surface at a given location, e.g. by sputtering.

A preferred embodiment comprised two thin-film platinum electrodes of 8 mm wide sputtered orthogonally placed on the channel walls.

Once the organic donor phase and the one or more aqueous acceptor phases have been introduced, an electric field is applied perpendicular to the flow of the organic phase, and the electroextraction process takes place.

A stable biphasic interface is realized by the use of the phase guide, which typically is a small feature present in the flow channel which stabilizes the liquid-liquid interface due to a meniscus pinning effect. It is very easy to incorporate in any chip architecture and reduces the risk of contamination.

The acceptor phase typically is in electrically conductive contact with a second electrode. This may conveniently be achieved by adding an electrically conductive material at least at one point in contact with the acceptor phase, thereby forming the second electrode; or alternatively, bringing the acceptor phase into contact with an electrode in the lumen of the device.

The sample may comprise dissolved components, or components that are suspended or emulsified in the donor phase.

Example 1

Figure 1:
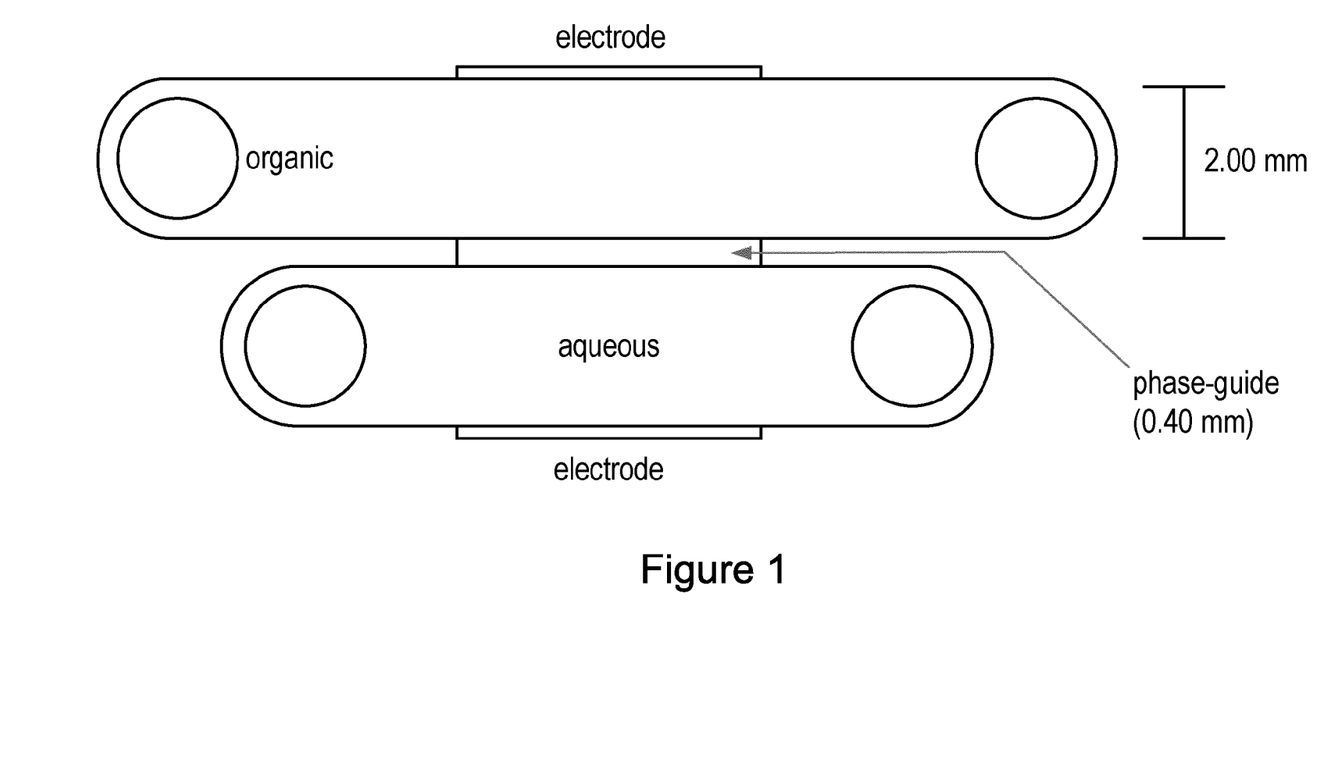
FIG. 1 discloses a schematic top view of an electroextraction chip, including a process line up, and a preferred device according to the present invention. Conduits in fluid connection with the channel at the circles are not shown.

The experiments were performed in a device for electroextraction as illustrated in FIG. 1.

Material and Methods

Chemicals: Toluene, 2-propanol, acetonitrile (ACN) and methanol, all analytical grade, were purchased from Biosolve B.V. (Valkenswaard, the Netherlands). ACS reagent grade 2-propanol, EtOAc (analytical grade) and the acyl-carnitines (carnitine, hexanoylcarnitine, octanoylcarnitine and lauroylcarnitine) were purchased from Sigma-Aldrich (St. Louis, Mo., USA). The demineralized water was made in-house using a Merck Millipore water purification system (Billerica, Mass., USA). Crystal violet (CV) was purchased from Merck (Darmstadt, Germany). Formic acid (FA) was purchased from Fisher Scientific-Acros Organics (Hampton, N.H., USA).

Instruments and Materials

The thin-film deposition system was used for depositing a 100 nm thick platinum electrodes was Leybold Heraeus Z-400 made by Oerlikon (Pfäffikon, Switzerland). Two-part syringes (2.5 ml) with a centred tip were purchased from Terumo (Tokyo, Japan). A KDS100 syringe pump was purchased from KD Scientific Inc. (Holliston, Mass., USA). The electrical field was applied with a Capella MCE power source, CapiliX (Leeuwarden, The Netherlands). An octadecyl Inertsil ODS-3 column (5 µm, 100 mm×1.0 mm) was purchased from GL Sciences Inc., (Torrance, Calif., USA). The HPLC was an Agilent 1100 series (Santa Clara, Calif., USA). The detector was a Bruker Daltonics MicrOTOF mass spectrometer (Bremen, Germany).

Fabrication of Chip

Based on the chemical resistance to ethyl acetate, cyclo olefin copolymer (COC) slides (75.5×25.5×1.5 mm) were chosen as chip substrate. COC chips were obtained from Microfluidic ChipShop GmbH (Jena, Germany). The chip was designed using computer-aided design software. SolidWorks® Premium 2010 by Dassault Systèmes SolidWorks Corp. (Vélizy-Villacoublay, France) was used to create a model, Mastercam® Design X3 by CNC Software, Inc. (Tolland, Conn., USA) was used to create G-codes and Mach3 by ArtSoft USA, part of Newfangled Solutions LLC (Fayette, Me., USA) was used to decode the G-codes in a XYZ movement of the Taig 3000 CNC-mill, Supertech EMC-xyz-GSBX driver (Phoenix, Ariz., USA). The mill (0.50 mm diameter, was operated at 5.000 RPM, feed rate 100 mm/min, plunge step 0.1 mm/step, plunge rate 1 mm/min. Burrs were removed with a soft brush, particulates were removed by washing the chips' surface with water and ultimately blowing the chip dry with compressed air. A mask was developed to enable thin-film platinum sputtering for realization of electrodes. Platinum deposition was performed at 0.5 kV at approximately 10-5 mbar for 40 with an Argon flow of 40 standard cubic centimetres per minute. The sputtering process resulted in an approximately 75-125 nm thick electrode. Slides were hermetically sealed by solvent bonding. The substrate surfaces were activated by placing them for 45 seconds in 70:30 v/v % toluene and 2-propanol. The activation process was quenched with an excess of ACS reagent grade 2-propanol and drying the surfaces using compressed air. After aligning the substrates a hot press (110° C.) operated at 25.97 kg/cm$^2$ (±1.56 kg/cm$^2$) for 15 minutes was used to hermetically seal the chip.

General Overview of the Manufactured Electroextraction Chip

The EE-chip shown in FIG. 1 was manufactured by a micro-milling and solvent bonding technique. The dimensions of the analyte donor channel were 15.00×2.00×0.50 mm and the dimensions for the analyte acceptor channel were 10.00×2.00×0.50. All milled features have an accuracy ±0.05 mm. A ridge of substrate material (8.00×0.40×0.20 mm), located in the middle of the analyte donor and acceptor channel, served as a stabilizer for the two immiscible solvent flows. Two perpendicular electrodes of approximately 8.00 mm long and 75-125 nm thick were sputtered alongside the channels. Holes were drilled (ID 1.2 mm) at the beginning and the end of the channels to serve as solvent inlet/outlet. A solvent bonding technique was used to create a hermetically sealed chip.

Figure 2B:
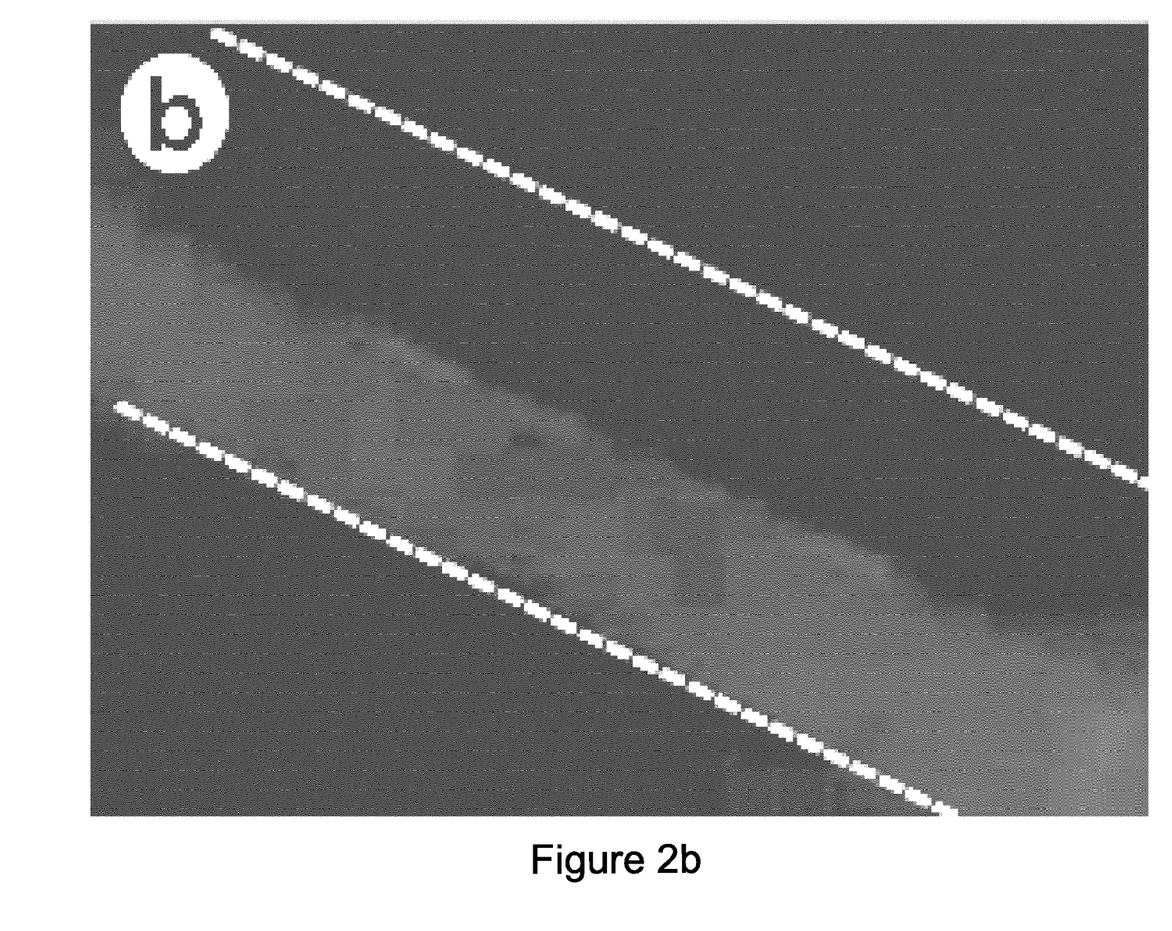
FIG. 2 discloses a top view of an actual EE chip. The EE chip features are shown as follows (from top to bottom): Pt electrode; microchannel comprising two immiscible liquids, held in place by a phase guide on the microchannel base while the phases have a direct interface; and again Pt electrode. The figure shows an actual example whereby an ethyl acetate crystal violet solution is fed with 30 µL/min flow along a stagnant aqueous phase.
Figure 2C:
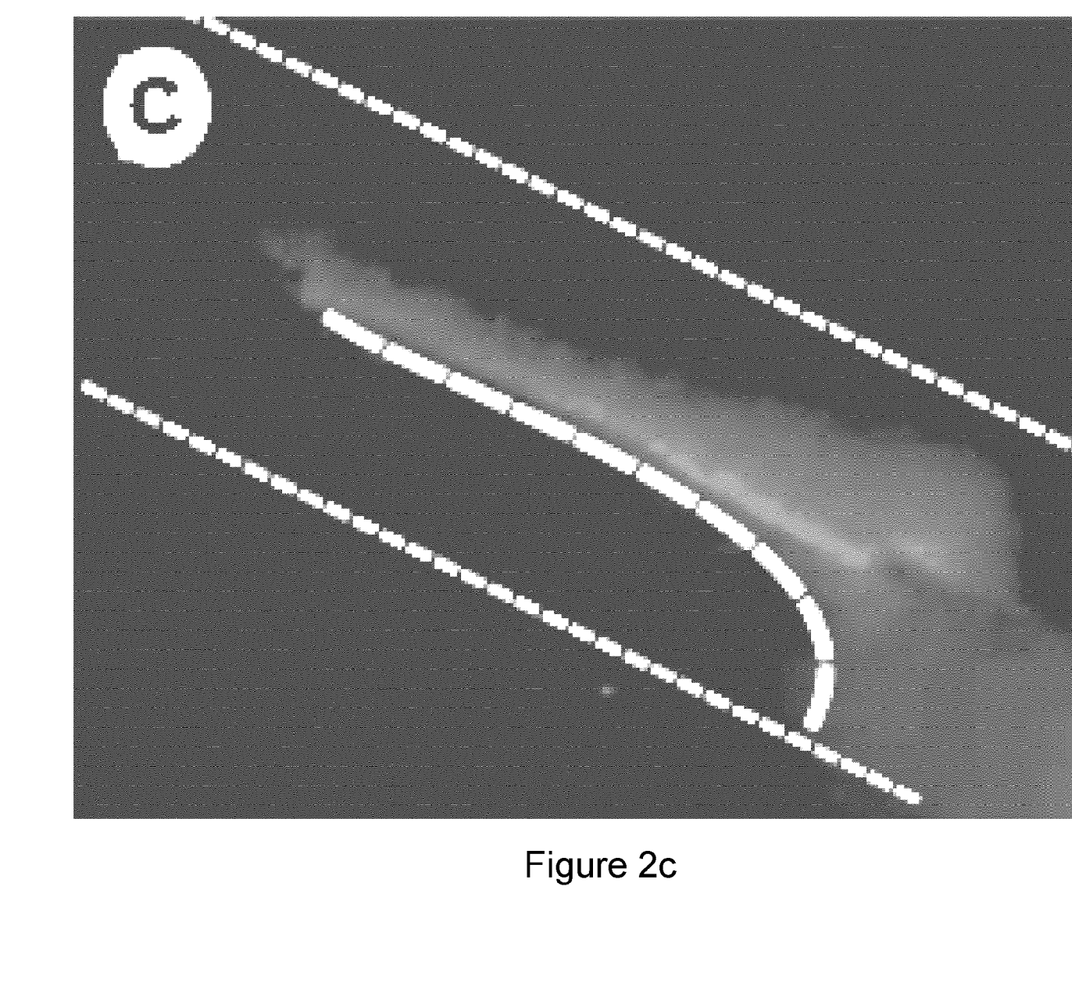
Figure 3:
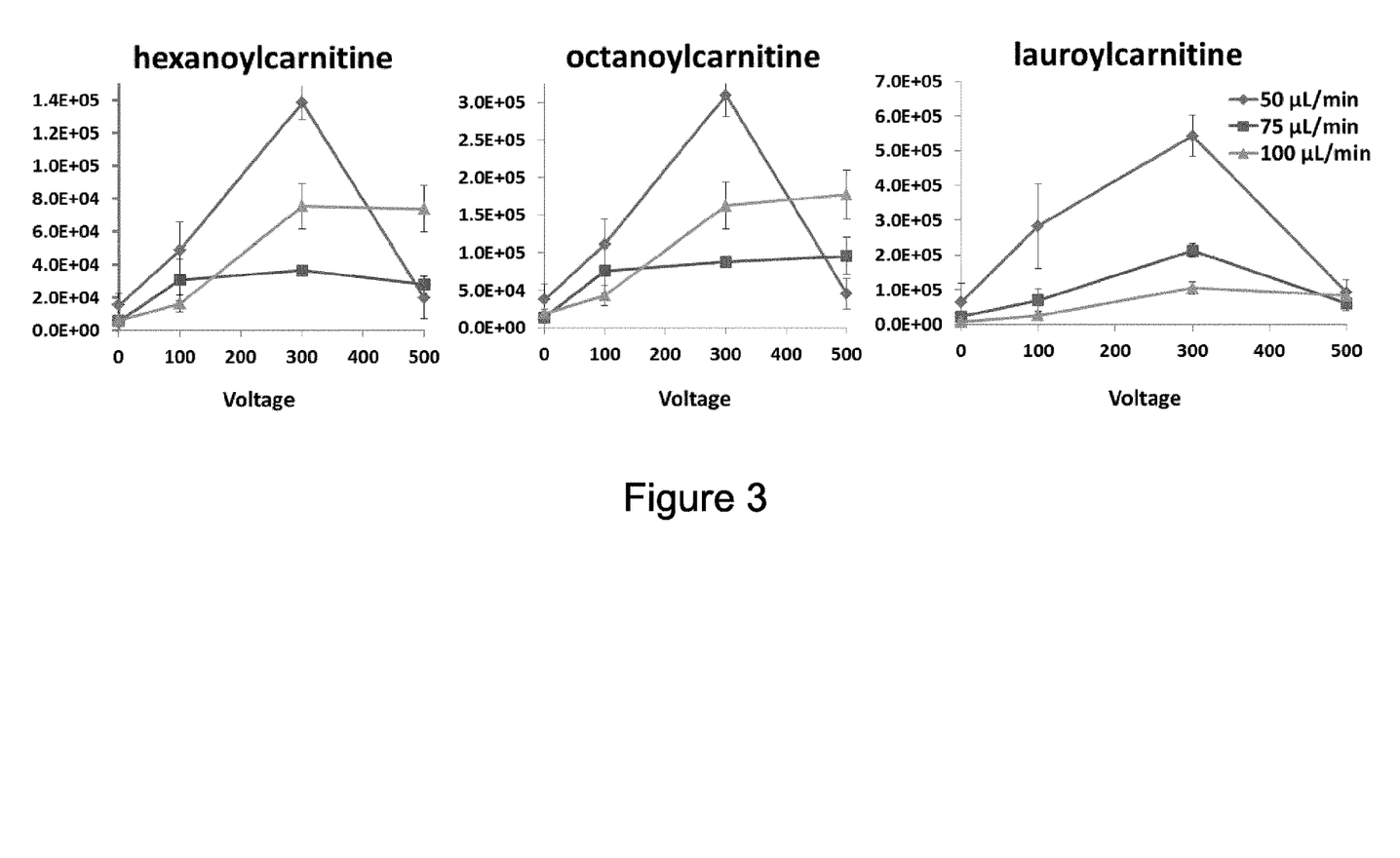
FIG. 3 illustrates the determination of optimal chip EE parameters based on the relative recoveries, means and standard deviations of three acylcarnitines which were obtained at 0, 100, 300 and 500V extraction voltages and 50, 75 and 100 µL/min ethylacetate feed rates.
Figure 4:
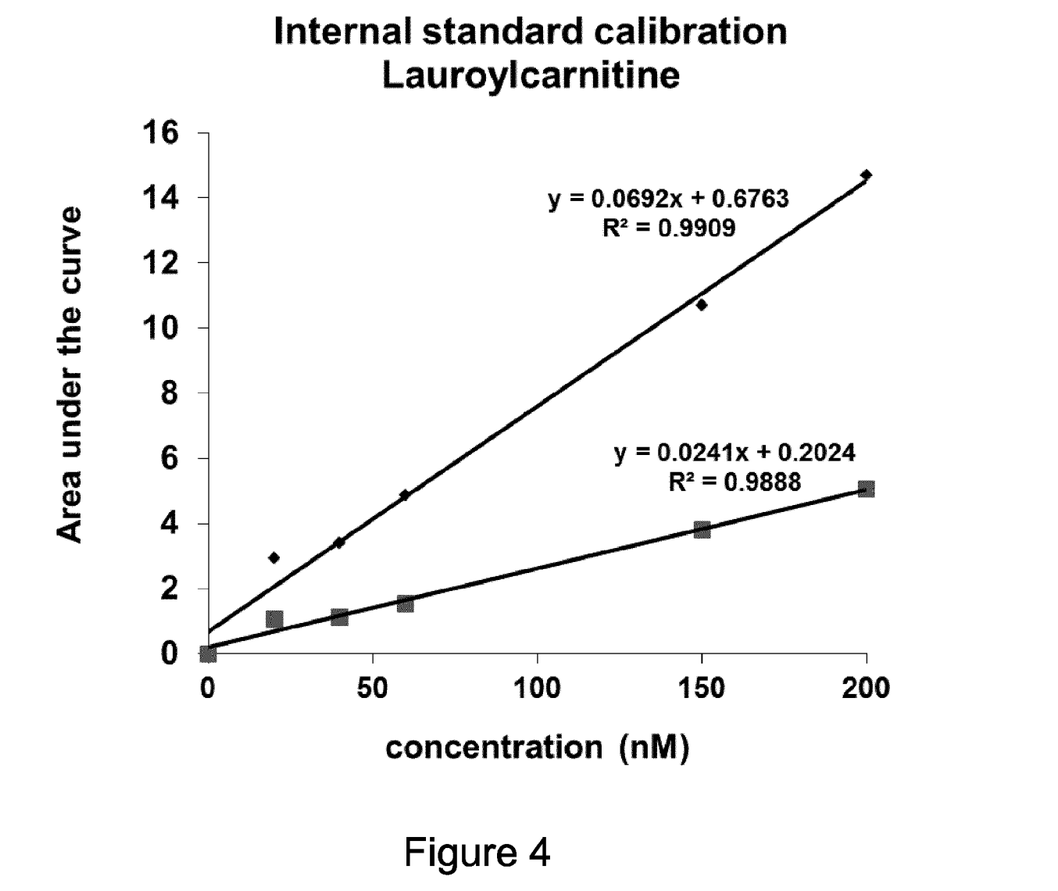
FIG. 4 shows the overlay of three LC-MS chromatograms which were obtained after chip EE, showing Chip EE calibration lines acquired for various concentration levels of octanoylcarnitine (a) and lauroylcarnitine (b) which were extracted at 300V from an EtOAc flow rate of 50 μL/min. All samples contained a 100 nM concentration of hexanoylcarnitine which served as internal standard.

The feasibility of chip-EE was assessed by visualizing depletion and concentration effects typical of the EE process. The black arrow in FIG. 2a marks the flow direction of an ethyl acetate (EtOAc) solution bearing crystal violet ions flowing with 30 μL/min along a stagnant aqueous phase. The depletion and concentration profile of crystal violet obtained after applying 0V and 80V each for 30 seconds, are shown in FIG. 2b and FIG. 2c. The dotted white line emphasizes the depletion and concentration profile. The practical chip handling capacity of the flow rate of the chip was roughly 300 μL/min at a potential of 1 kV. Higher flow rates and potentials lead to significant breakthrough effects or disruption of the EE process due to Joule heating.

Optimum Flow and Voltage Determination

The optimum of three flow rates (e.g. 50, 75 and 100 μL/min) and four extraction voltages (e.g. 0, 100, 300 and 500V) were assessed by chip based electroextraction of a sample containing three acylcarnitines (hexanoyl; octanoyl; lauroylcarnitine) and analyzing the aqueous sample aliquots by LC-MS. At 0V, there is no electric field yet analytes will slowly migrate from the organic towards the aqueous phase due to diffusion. Diffusion is able to transfer approximately 15% of the original carnitine concentration to the aqueous phase. At 100V, the electrical field speeds the migration velocities of positively charged analytes towards the aqueous phase. Approximately 50% of the carnitines were recovered from the aqueous phase. At 300V, approximately 100% of carnitines were recovered for all three analyte donor flow rates. At 500V, the recovery is decreased to 50%.

Linearity and Repeatability

The linearity of chip extracted analytes was examined by LC-MS analysis of octanoyl and lauroylcarnitine in six concentration levels ranging from 20-200 nM. All concentration levels were measured in triplicate. Octanoyl and lauroylcarnitine were dissolved in ethylacetate, pumped with a flow rate 50 μL/m in and extracted at 300V. The sample mixture also contained a 100 nm concentration of hexanoylcarnitine which served as an internal standard. The regression coefficients obtained for octanoylcarnitine and lauroylcarnitine are shown in were respectively 0.9909 and 0.9888

The repeatability of the method was derived by comparing the relative standard deviations of the calibration curve slopes.

Enhancement Factor

The signal enhancement factors, which were achieved with the chip-EE system, were determined by dividing the MS signal ratios of four model compounds. The signal ratios were obtained at 300V and 0V, the latter voltage being a control experiment for analyte transfer caused by passive diffusion.

To determine the signal enhancement factor for MS by chip-EE, a sample containing three carnitines and a peptide (hexanoylcarnitine, octanoylcarnitine and angiotensin) was prepared.

Figure 5:
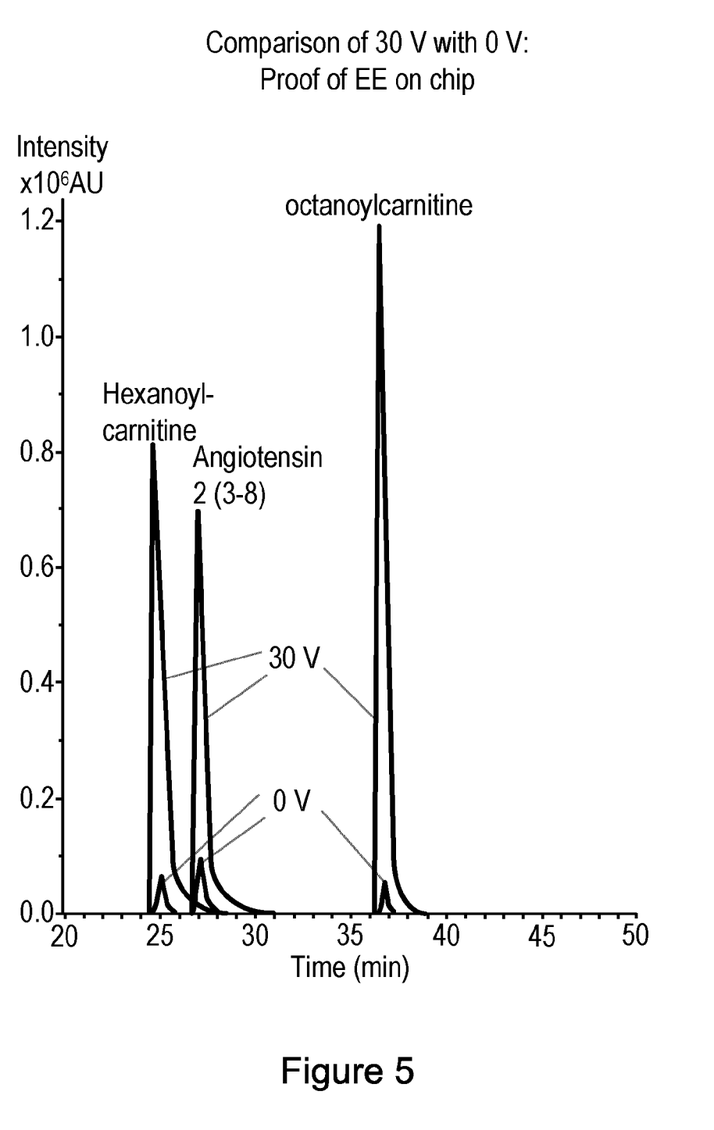
FIG. 5 shows an MS signal enhancement of two carnitines and a peptide by chip-EE.

The analytes were extracted from a 1 mL organic donor phase into a x mL aqueous phase. A control experiment in which 0 Volt was applied was used to determine the effect of analyte transfer from the organic phase to the aqueous phase by passive diffusion. The aqueous phase was then collected in an Eppendorf vial, 2 mL and measured off-line by LC-MS. The experiment was repeated three times at different concentration levels. The same experimental conditions were repeated for experiments where a 30 Volt potential was applied. The exemplary increases in signal for the two carnitines and the peptide are shown in FIG. 5.

Both of the calibration curves show good linearity over the tested range of concentrations. The 95% confidence intervals indicate that both the regressions for octanoylcarnitine and for lauroylcarnitine are significantly through 0. The repeatability of the method was checked by comparing the relative standard deviations of the slope of the calibration curves. The relative standard deviations were found to be satisfactory at 20% for the octanoylcarnitine curve and 21% for the lauroylcarnitine curve. Every new batch of chips was tested by filling with an aqueous 5% FA (v/v) solution and applying a voltage. If the measured current was the same as the other chip the chip performance was judged to be good.

The above examples illustrate the effectiveness of the subject process and device, in particular when coupled to a highly sensitive analysis method, such as nanoelectrospray-Direct-Infusion-MS.

The invention claimed is:

1. A process for an electroextraction of organic compounds from a moving fluid donor phase into an acceptor phase, the process comprising:
   providing an electrically conductive donor phase moving at a first flow velocity and in electrically conductive contact with a first electrode;
   providing an electrically conductive acceptor phase in direct contact and immiscible with the donor phase, in electrically conductive contact with a second electrode;
   providing a supporting or confining phase guide pattern having a sharp edge to keep a defined interface between the donor phase and the acceptor phase, wherein the sharp edge is shaped such that advancement of a fluid over the sharp edge requires a change of a principal radii of a fluid-fluid meniscus, leading to a higher pressure drop over the fluid-fluid meniscus thus representing a pressure barrier; and applying an electrical field between the first electrode and the second electrode, wherein the electrical field has a current between 0.01 μA and 100 μA for an interface length of 8 mm;

wherein one of the donor phase and the acceptor phase is an organic phase and an other of the donor phase and the acceptor phase is an aqueous phase; and wherein the acceptor phase is moving at a second flow velocity which is lower than the first flow velocity.

2. The process according to claim 1, wherein the acceptor phase is moving co-directionally with the donor phase.

3. The process according to claim 1, wherein the donor phase and/or the acceptor phase remain immiscible during the process.

4. The process according to claim 1, wherein the electrical field is applied sufficiently high and in a sufficiently long period of time to allow at least part of the organic compounds to migrate from the donor phase to the acceptor phase, or to the defined interface between the donor phase and the acceptor phase.

5. The process according to claim 1, wherein a further acceptor phase is present at an opposite side of the acceptor phase and in direct contact with the donor phase, and wherein the first electrode is arranged in the further acceptor phase, and wherein the electrically conductive contact with the donor phase occurs through the further acceptor phase.

6. The process according to claim 1, further comprising:
removing the acceptor phase comprising migrated analytes; and
subjecting the removed acceptor phase to a further separation and/or analysis process.

7. The process according to claim 6, wherein the further separation and/or analytical process comprises one or more of liquid chromatography (LC), reversed phase (RP) LC, normal phase (NP) LC, thin layer chromatography (TLC), capillary electrophoresis (CE), nuclear magnetic resonance (NMR), mass spectrometry (MS) gas chromatography/mass spectrometry (GC/MS), GC-MS/MS, nanoelectrospray-Direct-Infusion-MS, ultraviolet/visible light (UV/VIS), nano LC, high-performance liquid chromatography (HPLC), ultra-high performance LC (UPLC); RP-(UV/VIS)-EV-NP-MS, RP-(UV/VIS)-EV-NMR, NP-(UV/VIS)-EV-CE-MS/RP-(UV/VIS)-EV-CE-MS, RP(UV/VIS)-EV-TLC/NP-(UV/VIS)-EV-TLC, EV-nano LC, and CE-EV.

8. The process according to claim 1, wherein the donor phase is a result of a previous separation and/or analysis process.

9. The process according to claim 1, wherein the organic compounds are selected from pharmaceuticals, drugs, coloring agents, food additives, metabolites, nucleotides (such as DNA or RNA), proteins, peptides, amino acids, carbohydrates, lipids, polysaccharide fatty acids or phospholipids.

* * * * *